United States Patent
Horikawa (10) Patent No.: US 12,160,664 B2
(45) Date of Patent: Dec. 3, 2024

(54) FOCUS DETECTING APPARATUS, IMAGE PICKUP APPARATUS, FOCUS DETECTING METHOD, AND STORAGE MEDIUM

(71) Applicant: CANON KABUSHIKI KAISHA, Tokyo (JP)

(72) Inventor: Yohei Horikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 39 days.

(21) Appl. No.: 18/157,938

(22) Filed: Jan. 23, 2023

(65) Prior Publication Data

US 2023/0247289 A1 Aug. 3, 2023

(30) Foreign Application Priority Data

Feb. 1, 2022 (JP) ................................. 2022-014139

(51) Int. Cl.
*H04N 23/67* (2023.01)
*H04N 23/68* (2023.01)

(52) U.S. Cl.
CPC ....... *H04N 23/675* (2023.01); *H04N 23/6811* (2023.01); *H04N 23/683* (2023.01)

(58) Field of Classification Search
None
See application file for complete search history.

(56) References Cited

U.S. PATENT DOCUMENTS

| | | | |
|---|---|---|---|
| 2012/0013786 A1* | 1/2012 | Yasuda | H04N 23/635 348/349 |
| 2016/0227102 A1* | 8/2016 | Iwasaki | H04N 23/61 |
| 2019/0278052 A1* | 9/2019 | Kikuchi | G02B 7/09 |
| 2020/0252551 A1* | 8/2020 | Hirose | H04N 23/675 |
| 2020/0344406 A1* | 10/2020 | Takeuchi | H04N 23/80 |
| 2022/0353427 A1* | 11/2022 | Kawanishi | H04N 23/672 |

FOREIGN PATENT DOCUMENTS

| JP | 2015-022058 A | 2/2015 |
|---|---|---|
| JP | 2018-036366 A | 3/2018 |
| JP | 2021-152600 A | 9/2021 |

* cited by examiner

*Primary Examiner* — James M Hannett
(74) *Attorney, Agent, or Firm* — Cowan, Liebowitz & Latman, P.C.

(57) ABSTRACT

A focus detecting apparatus includes a first determining unit configured to determine an image stabilizing area based on object information, and a second determining unit configured to determine a focus detecting area based on the object information, and to determine a calculation area for focus detection based on the focus detecting area. The second determining unit determines the calculation area based on a relationship between the image stabilizing area and the focus detecting area.

19 Claims, 10 Drawing Sheets

| OBJECT DETECTION INFORMATION |
|---|
| INDEX |
| INDEX OF PREVIOUS FRAME |
| POSITION |
| SIZE |
| RELIABILITY |
| OBJECT TYPE |

IMAGE STABILIZING AREA COVERS THE ENTIRE ANGLE
OF VIEW AND FOCUS DETECTING AREA IS PART OF IT

FIG. 9A

IMAGE STABILIZING AREA AND FOCUS DETECTING
AREA ARE APPROXIMATELY IDENTICAL

FIG. 9B

IMAGE STABILIZING AREA AND FOCUS DETECTING
AREA ARE DIFFERENT

FOCUS DETECTING APPARATUS, IMAGE PICKUP APPARATUS, FOCUS DETECTING METHOD, AND STORAGE MEDIUM

BACKGROUND

Technical Field

One of the aspects of the disclosure relates to a focus detecting apparatus and an image pickup apparatus.

Description of the Related Art

There has conventionally been known a focus detecting apparatus that detects an object and performs focus detection. Japanese Patent Laid-Open No. ("JP") 2015-22058 discloses a focus detecting method for setting a field length and a read position of an image signal for focus detection based on a position and size of a detected object. JP 2021-152600 discloses a method for avoiding a (perspective conflict) phenomenon in which the background is focused instead of an object in a case where a focus detecting area goes out of the object. JP 2018-36366 discloses an image stabilizing apparatus that performs control so as to always capture an object within an angle of view in a case where the object in the captured image is blurred (object blur).

In a case where different controls are performed for the object as an object image stabilization target disclosed in JP 2018-36366 and the object as a focus detection target disclosed in JPs 2015-22058 and 2021-152600, the object is likely to go out of the focus detecting area. This is because the object image stabilization negatively reflects a transfer of the object so as to prevent the imaging quality from being lowered, whereas the focus detection needs control that continues focusing by sensitively responding to the transfer of the object.

SUMMARY

One of the aspects of the disclosure provides a focus detecting apparatus that can perform highly accurate focus detection while performing object image stabilization.

A focus detecting apparatus according to one aspect of the disclosure includes at least one processor, and a memory coupled to the at least one processor, the memory having instructions that, when executed by the processor, perform operations as a first determining unit configured to determine an image stabilizing area based on object information, and a second determining unit configured to determine a focus detecting area based on the object information, and to determine a calculation area for focus detection based on the focus detecting area. The second determining unit determines the calculation area based on a relationship between the image stabilizing area and the focus detecting area. An image pickup apparatus having the above focus detecting apparatus, a focus detecting method corresponding to the above focus detecting apparatus, and a storage medium storing a program that causes a computer to execute the above control method also constitute another aspect of the disclosure.

Further features of the disclosure will become apparent from the following description of exemplary embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Referring now to the accompanying drawings, a detailed description will be given of embodiments according to the disclosure.

First Embodiment

Figure 1:
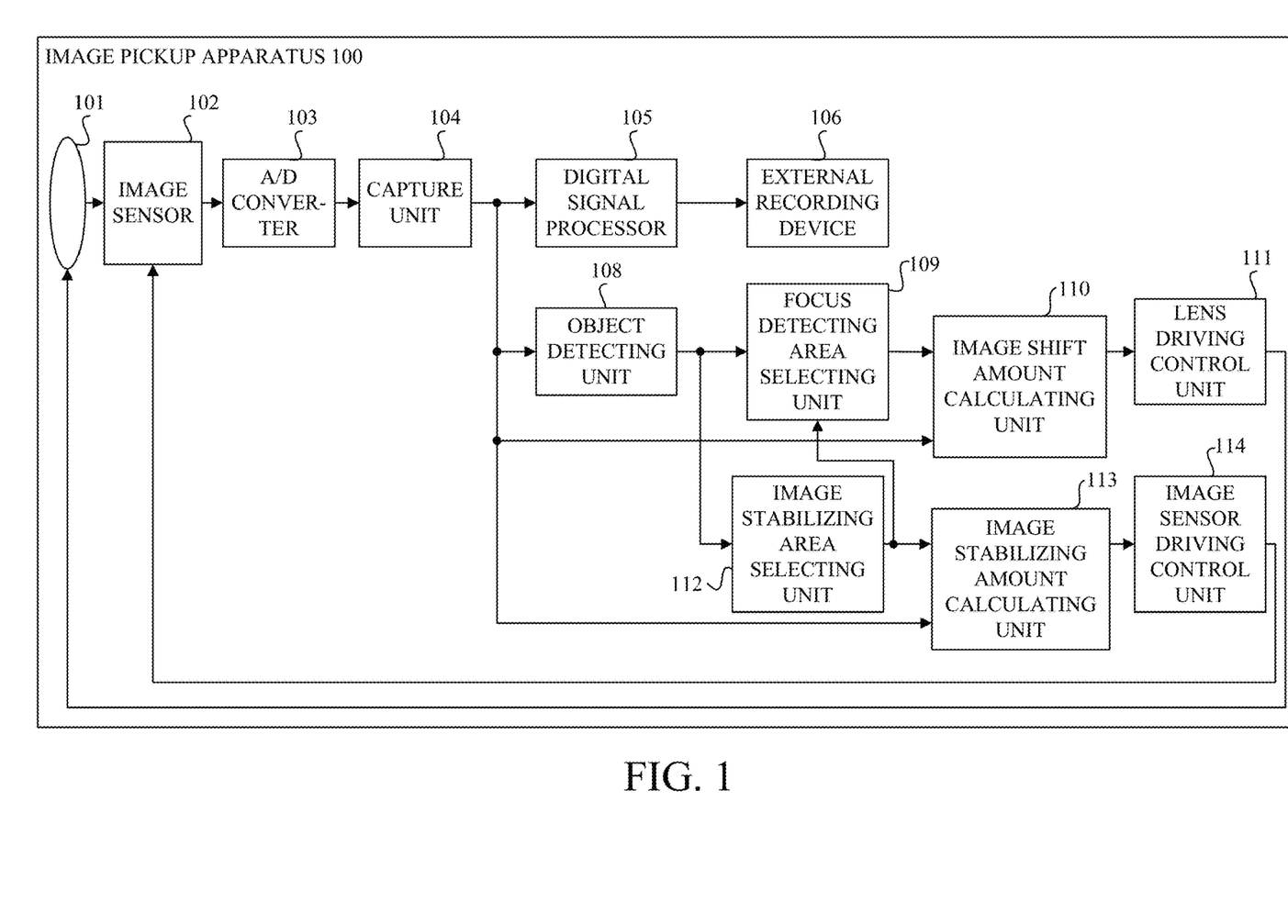
FIG. 1 is a block diagram of an image pickup apparatus according to each embodiment.

Referring now to FIG. 1, a description will be given of an image pickup apparatus (focus detecting apparatus) 100 according to a first embodiment of the disclosure. FIG. 1 is a block diagram of an image pickup apparatus 100 according to this embodiment. FIG. 1 does not illustrate blocks that are not directly related to a characteristic of this embodiment.

Reference numeral 101 denotes an optical system unit that includes an optical lens unit (imaging optical system), which includes a focusing lens for providing focusing, a shutter, an aperture stop (diaphragm), a lens control unit, etc., and is driven and controlled by a lens driving control unit 111, which will be described below. The lens driving control unit 111 outputs a driving signal for the focusing lens included in the optical system unit 101 according to a defocus amount calculated by an image shift amount calculating unit 110, which will be described below. In this embodiment, the image pickup apparatus 100 is integrated with the optical system unit 101, but the disclosure is not limited to this embodiment, and the optical system unit may be attachable to and detachable from the image pickup apparatus.

An image sensor 102 is a photoelectric conversion element having unit pixel cells arranged in a two-dimensional matrix, and exposure control is performed by the shutter and aperture stop included in the optical system unit 101. The unit pixel cells in the image sensor 102 are driven to an arbitrary position within an image circle projected by the optical system unit 101 by an image sensor driving control unit 114, which will be described below.

Figure 2A:
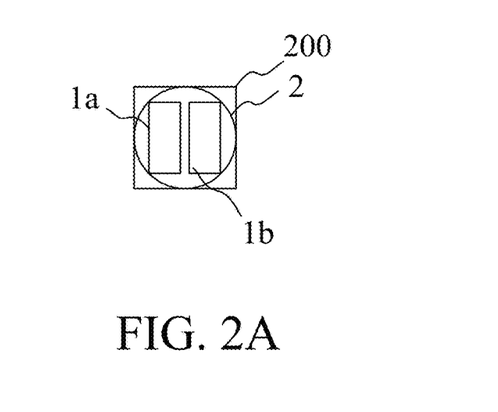
FIGS. 2A and 2B are a front view of a unit pixel cell in an image sensor and a two-dimensional arrangement diagram of the unit pixel cells according to each embodiment.
Figure 2B:
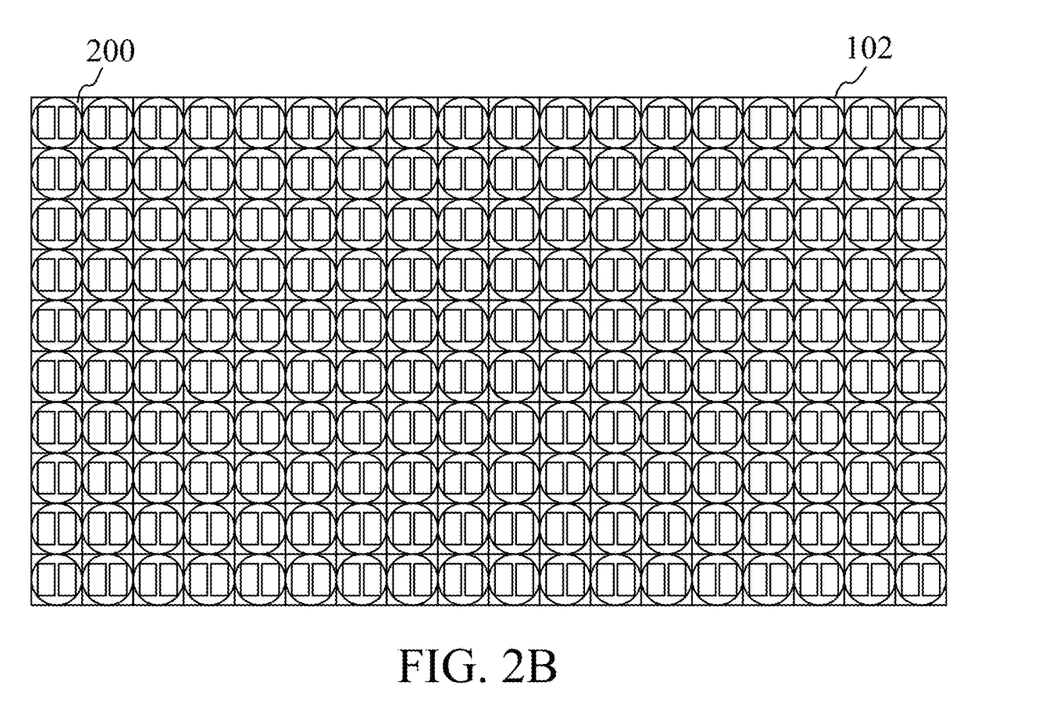

Referring now to FIGS. 2A and 2B, a description will be given of the configuration of the image sensor 102. FIG. 2A is a front view of the unit pixel cell 200 in the image sensor 102. FIG. 2B is a two-dimensional arrangement diagram of the unit pixel cells 200. As illustrated in FIG. 2B, the image sensor 102 has the unit pixel cells 200 that are repeatedly arranged in a Bayer array.

As illustrated in FIG. 2A, the unit pixel cell 200 has a microlens 2 and pixels 1a and 1b including photodiodes (PDs). The pixels 1a and 1b are divided PDs that take in incident light through the same microlens 2. An output from each divided PD can provide a pupil-divided image by its arrangement. Hereinafter, an image (image signal) obtained by the pixel 1a will be referred to as an A-image (A-image signal), and an image (image signal) obtained by the pixel 1b will be referred to as a B-image (B-image signal).

An A/D converter 103 converts an analog electric signal made through analog signal processing in an analog signal processor (not illustrated) and output from the image sensor 102 into a digital electric signal (pixel signal), and outputs the pixel signal to a capture unit 104. The analog signal processor includes a Correlated Double Sampling (CDS) circuit, a nonlinear amplifier circuit, and the like for removing noise on a transmission line. The capture unit 104 determines an effective period and type of the pixel signal, and outputs the pixel signals of the A-image and the B-image to a digital signal processor 105, an object detecting unit 108, an image shift amount calculating unit 110, and an image stabilizing amount calculating unit 113.

The digital signal processor 105 performs addition processing between divided pixels for the A-image and the B-image input in the Bayer array, and performs digital signal processing represented by synchronization processing, gamma processing, and noise reduction processing. Image data to which the digital signal processing has been applied is converted into compressed image data represented by JPEG, and output to an external recording device 106 for recording. The technologies of the synchronization processing, the gamma processing, the noise reduction processing, and the JPEG compression are not directly related to this embodiment, and a description thereof will be omitted.

The object detecting unit 108 detects an object, adds object information to the captured image data (pixel signal), and outputs it to the focus detecting calculation area selecting unit 109 and the image stabilizing area selecting unit 112.

Figure 5A:
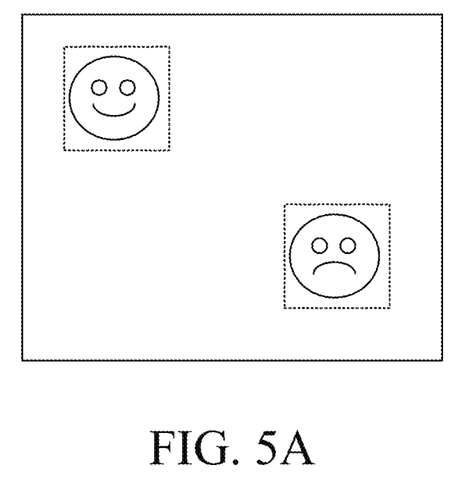
FIGS. 5A and 5B explain objects detected by an object detecting unit and object detection information according to each embodiment.
Figure 5B:
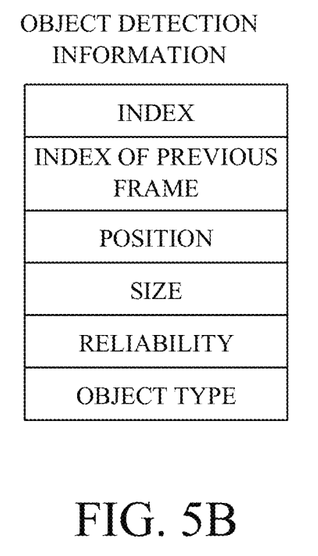

Referring now to FIGS. 5A and 5B, a description will be given of objects detected by the object detecting unit 108 and object detection information. FIG. 5A explains objects detected by the object detecting unit 108. FIG. 5B explains the object detection information.

FIG. 5A illustrates two objects that exist within an angle of view. The object detecting unit 108 gives the object detection information illustrated in FIG. 5B to the angle of view. Here, the object detection information has an index of each object, an index tagged in a case where the same objects exist in the previous frame, detected coordinates (positions), and a size that is information about the widths and heights. The object detecting unit 108 assigns the detection reliability of each object and an object type. The detection reliability is output, for example, such that the reliability of a frame facing the back or side is lower than the reliability of the object detection of a front face. The object type information includes information such as a detected person, vehicle, and animal, and also part information such as an eye portion, an entire face, a side face, and a head.

The focus detecting calculation area selecting unit 109 and the image stabilizing area selecting unit 112 perform control so as to select a calculation area (focus detecting calculation area) of the next frame based on the object detection result using the captured image of the previous frame. This configuration can shorten the feedback time for lens driving control, which will be described below. Therefore, it is unnecessary to refer to the object detection result of the same frame.

The image stabilizing area selecting unit 112 selects (determines) an area (image stabilizing area) for image stabilization of the angle of view based on the object information output from the object detecting unit 108, and outputs information about the selected area to the image stabilizing amount calculating unit 113 and focus detecting calculation area selecting unit 109. If the detected object having the highest reliability is repetitively selected as the image stabilization target, the angle of view observed by the user may not be stable and the imaging quality may be significantly lowered. For this reason, the image stabilizing area selecting unit 112 performs control so that the reliability is high and the object index of the previous frame and the object for the image stabilization do not frequently change. In a case where the reliabilities of all detected objects are low, image stabilization (blur correction of the entire angle of view) is performed so as to perform image stabilization without lowering the viewing quality of the user.

The image stabilizing amount calculating unit 113 calculates a motion amount (motion vector) between the previous frame and the current frame of the area selected by the image stabilizing area selecting unit 112 based on correlation calculation represented by Sum of Absolute Difference (SAD), and outputs the calculated motion vector to the image sensor driving control unit 114. The image sensor driving control unit 114 drives the image sensor 102 based on the motion vector output from the image stabilizing amount calculating unit 113 and restricts (controls) a read range so that the area selected by the image stabilizing area selecting unit 112 stops at the center of the angle of view.

This embodiment performs control so as to move the image sensor 102 to read out an arbitrary optical image within the image circle but, for example, may specify the position of the image read out of the image sensor 102.

Control may be performed so as to cut and output part of the range read out of the image sensor 102 at all angles of view at the capture unit 104.

Based on the object information output from the object detecting unit 108 and the information on the area selected by the image stabilizing area selecting unit 112, the focus detecting calculation area selecting unit 109 determines (selects) the coordinates (position) of the focus detecting calculation area and an image (calculation area) in which correlation calculation is to be performed by the image shift amount calculating unit 110, which will be described below. The focus detecting calculation area selecting unit 109 then outputs information on the focus detecting calculation area (calculation area) to the image shift amount calculating unit 110.

Figure 9A:
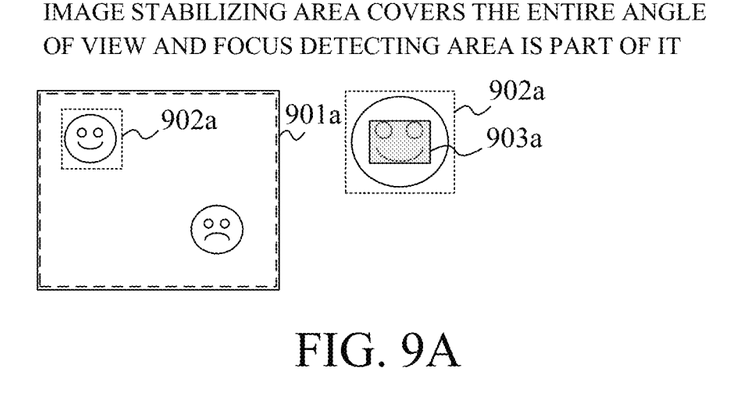
FIGS. 9A to 9C explain a focus detecting calculation area based on a relationship between an image stabilizing area and a focus detecting area according to a first embodiment.
Figure 9B:
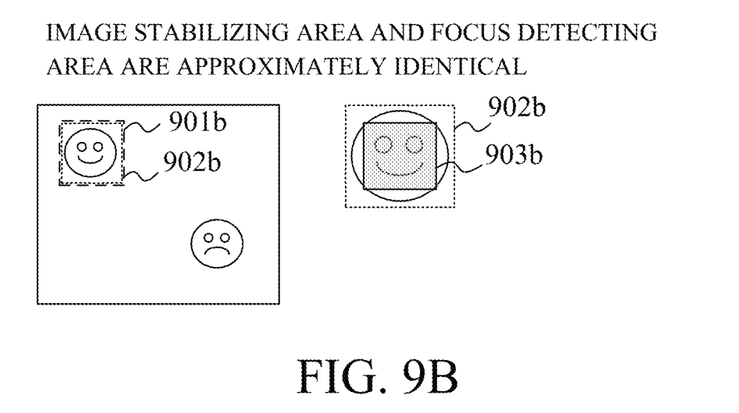
Figure 9C:
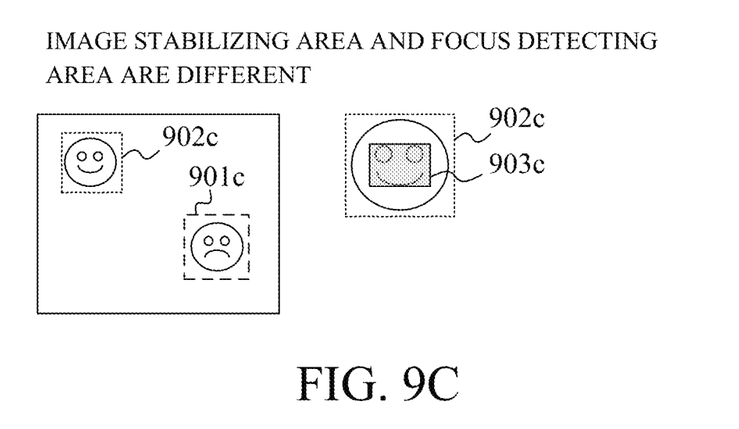

Referring now to FIGS. 9A to 9C, a description will be given of the focus detecting calculation area (calculation area) determined by the focus detecting calculation area selecting unit 109 based on the object information and the image stabilizing area. FIGS. 9A to 9C explain the focus detecting calculation area (calculation area) that is based on the relationship between the image stabilizing area and the focus detecting area. In FIGS. 9A to 9C, an alternate long and short dash line indicates the image stabilizing area, a dotted line indicates the focus detecting area, and the focus detecting calculation area (calculation area) is enlarged on the right side of each figure as a gray area.

In FIG. 9A, an image stabilizing area 901a covers the entire angle of view, and a focus detecting area 902a exists within the angle of view (or the focus detecting area 902a is part of the image stabilizing area 901a). In this case, due to object blur, the object is likely to go out of the area for capturing the object, so control is performed so that a calculation area 903a is smaller than the focus detecting area 902a. In a case where the image stabilizing function is turned off by an unillustrated user instruction member, image stabilization does not work, the object is more likely to go out of the area for capturing the object. In such a case, control may be performed so as to make smaller the calculation area 903a.

In FIG. 9B, an image stabilizing area 901b and a focus detecting area 902b are approximately the same. In this case, due to the camera shake and object blur, the displacement of the object position tends to be stable within the angle of view. Therefore, control is performed so as to widen a calculation area 903b.

In FIG. 9C, an image stabilizing area 901c and a focus detecting area 902c are different. In this case, due to the object blur, the displacement of the object position tends to be unstable within the angle of view. Therefore, control is performed so as to make a calculation area 903c smaller than the focus detecting area 902c.

A description will now be given of a reason for this control. The object as a focusing target is selected by the focus detecting calculation area selecting unit 109 independently of the image stabilization. For example, in a sport that needs a plurality of people, it is desirable that the object face may be exposed to the image pickup apparatus 100, and in a situation where only the back of the head can be captured, the value of the captured image tends to be low even if the object is in focus. Therefore, by setting high the sensitivity for an object as a image stabilization target, a valuable captured image can be obtained.

A description will now be given of a difference between an effect of a smaller calculation area and an effect of a large calculation area. In a case where the calculation area is made small, the XY coordinates (position) of the focus object in the next frame are predicted based on the object detection result of the previous frame, the calculation area is selected, and calculation is performed, the control has an effect in that objects located at different distances are not mixed in the calculation area. Therefore, it is less likely to erroneously focus on the background and foreground included in the calculation area. On the other hand, in a case where the calculation area is made large, the calculation area (focus detecting calculation area) for the same object can be widely secured. Therefore, the in-focus accuracy can be improved because the influence of factors can be reduced such as a high ISO speed, low illuminance, and low contrast, which prevent the focus detecting calculation.

The image shift amount calculating unit 110 calculates an image shift amount between the A-image (A-image signal) and the B-image (B-image signal) output from the capture unit 104, and outputs the calculated image shift amount to the lens driving control unit 111. The lens driving control unit 111 converts the image shift amount into a defocus amount, and drives the focus lens in the optical system unit 101 (performs focus control).

The image shift amount between the A-image and the B-image is calculated for each rectangular area obtained by dividing the unit pixel cells 200 arranged in a two-dimensional matrix illustrated in FIG. 2B into N×M. The calculation area is determined according to the output of the focus detecting calculation area selecting unit 109 of the previous frame. The position where the object exists is selected based on the obtained N×M focus detecting calculation results and the coordinates (position) of the focus detecting calculation area of the current frame. Due to this control, lens driving control with low latency (low delay time) can be acquired without waiting for the processing of the object detecting unit 108 to the current frame. The range and position of the focus detecting calculation area are determined according to the output signal from the focus detecting calculation area selecting unit 109.

Figures 3A, 3B:
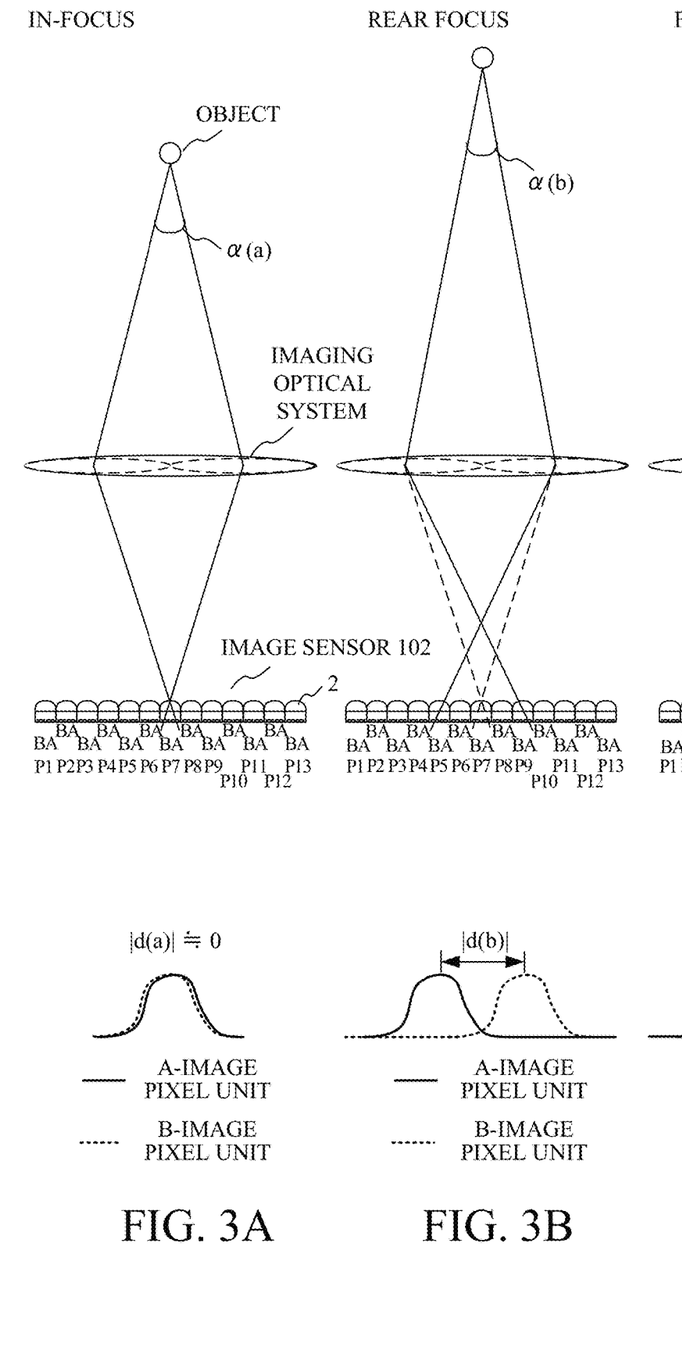
FIGS. 3A to 3C explain the principle of focus detection using the image sensor in each embodiment.
Figure 3C:
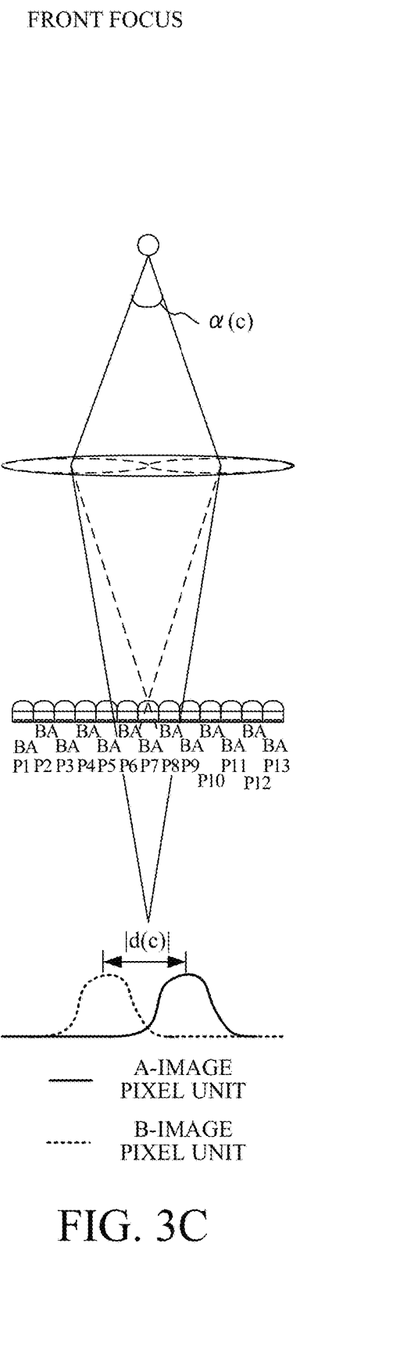

Referring now to FIGS. 3A to 3C, a description will be given of the principle of focus detection using a phase difference. FIGS. 3A to 3C explain the principle of focus detection using the image sensor 102. The image sensor 102 illustrated in FIGS. 3A to 3C has a plurality of unit pixel cells 200 as described with reference to FIGS. 2A and 2B. The positions of the unit pixel cells 200 are indicated by unit pixel cells P1 to P13, respectively. The pixels 1a and 1b in the unit pixel cell 200 are indicated as pixels A and B, respectively.

There are arranged a plurality of unit pixel cells P each having divided pixels A and B under one microlens 2. The pixels A and B placed under the microlens 2 are pixels that are divided using the microlens 2 as an exit pupil. During the focus detection, signals output from a plurality of pixels A (A-image pixel unit) and signals output from a plurality of pixels B (B-image pixel unit) are combined in the column direction (or in the row direction) to generate the A-image and the B-image as outputs of the same color unit pixel cell unit. The shift of each corresponding point is calculated by the SAD calculation. The result of the SAD calculation is obtained by the following equation (1).

$$C = \Sigma |YAn - YBn| \qquad (1)$$

In equation (1), n is the number (number) of microlenses in a range for performing the SAD calculation (correlation calculation) in the horizontal direction. YAn and YBn are a luminance signal of the A-image and a luminance signal of the B-image, respectively, corresponding to an n-th microlens. A value obtained by shifting a corresponding pixel for the luminance signal YBn of the B-image is plotted, and a position that minimizes the shift amount is an in-focus position.

In the in-focus state illustrated in FIG. 3A, imaging positions of the imaging optical system are the pixels A and B under the microlens of the unit pixel cell P7 and thus the A-image pixel unit and the B-image pixel unit approximately coincide with each other. At this time, an image shift amount d(a) between the A-image pixel unit and the B-image pixel unit obtained by the correlation calculation is approximated to zero.

In a rear focus state illustrated in FIG. 3B, imaging positions of the imaging optical system are the pixel A under the microlens of the unit pixel cell P9 and the pixel B under the microlens of the unit pixel cell P5. At this time, an image shift amount d(b) is generated between the A-image pixel unit and the B-image pixel unit obtained by the correlation calculation.

In a front focus state illustrated in FIG. 3C, imaging positions of the imaging optical system are the pixel A under the microlens of the unit pixel cell P5, and the pixel B under the microlens of the unit pixel cell P9. At this time, an image shift amount between the A-image pixel unit and the B-image pixel unit obtained by the correlation calculation is an image shift amount d(c) in a direction opposite to that of the rear focus state illustrated in FIG. 3B.

This means that the A-image pixel unit and the B-image pixel unit correspond to the same object in the in-focus state, but the A-image pixel unit and the B-image pixel unit correspond to objects shifted by the image shift amount d in the back focus state and the front focus state. The well-known technology can calculate a defocus amount based on the image shift amount d as a minimum value of the correlation calculation result, and a baseline length, and a focusing operation on the object can be performed.

Figure 6:
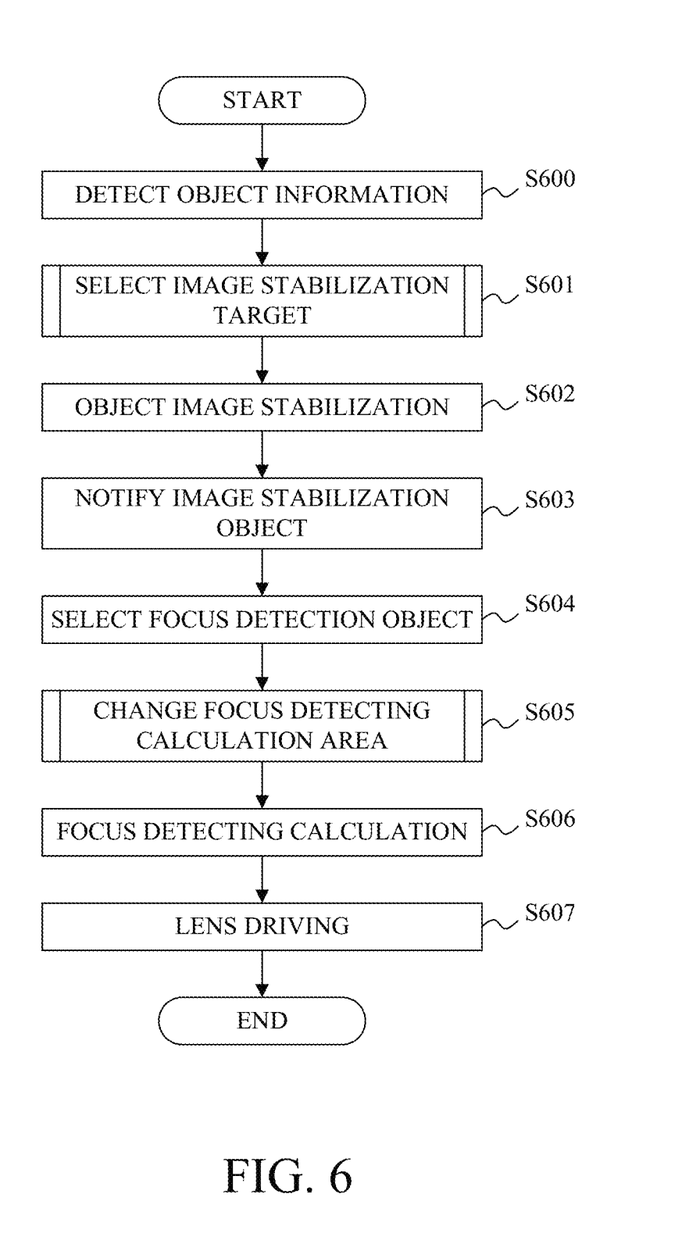
FIG. 6 is a flowchart illustrating the operation of the image pickup apparatus according to each embodiment.

Referring now to FIG. 6, a description will be given of an operation from object detection by the object detecting unit 108 during live-view imaging of the image pickup apparatus 100 to the lens driving completion by the lens driving control unit 111. FIG. 6 is a flowchart illustrating the operation of the image pickup apparatus 100.

First, in step S600, the object detecting unit 108 detects an object or objects and generates object information. Next, in step S601, the image stabilizing area selecting unit 112 refers to the detected object(s) and generated object information in step S600, and determines an object and an image stabilizing area for image stabilization (selects an image stabilization target).

Figure 7:
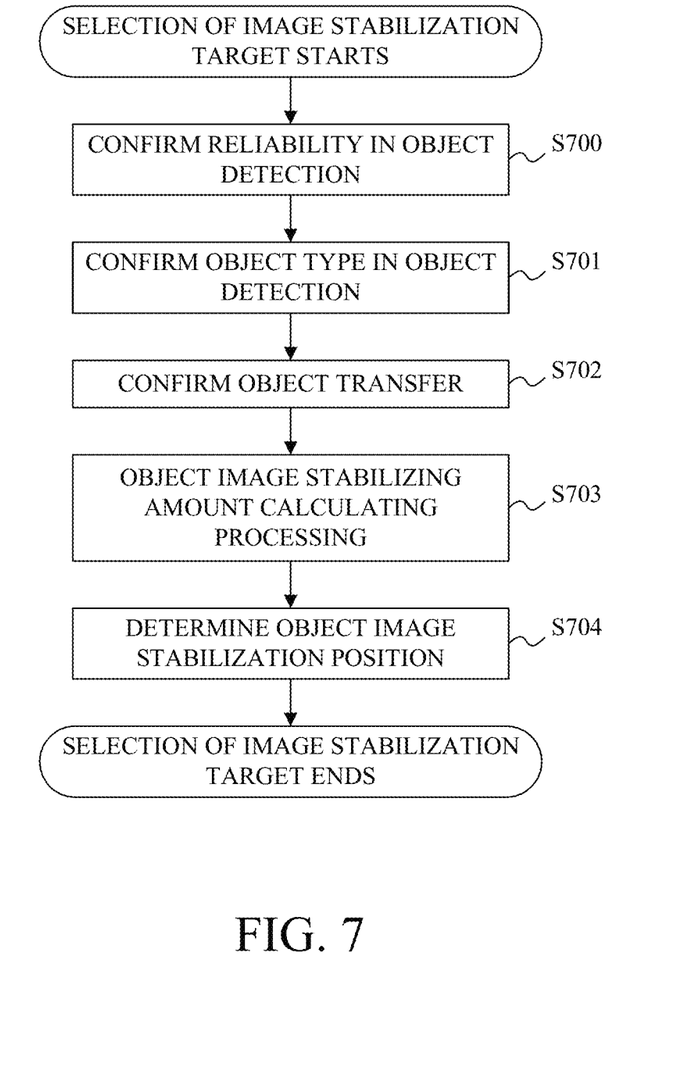
FIG. 7 is a flowchart illustrating image stabilization target selecting processing according to each embodiment.

Referring now to FIG. 7, a detailed description will be given of the processing of step S601 (selection of the image stabilization target). FIG. 7 is a flowchart illustrating selecting processing of the image stabilization target.

First, in step S700, the image stabilizing area selecting unit 112 checks the reliabilities of all the detected objects, and assigns flag information indicating image stabilization target candidates to objects whose reliability values are higher than a threshold. Next, in step S701, the image stabilizing area selecting unit 112 confirms an object type, and determines whether or not the target object is an object type for image stabilization. If the target object is the object type for image stabilization, the image stabilization target candidate flag is enabled (made valid). On the other hand, if the target object is not the object type for image stabilization, the image stabilization target flag is disabled (made invalid). Here, the object type for image stabilization includes a person, an animal, a vehicle, and the like selected by an unillustrated user instruction member.

Next, in step S702, the image stabilizing area selecting unit 112 determines whether or not there is the same object as the object that is a determination target for image stabilization in the previous frame among the objects for which the image stabilization target candidate flag is enabled in the current frame. If the same object exists, the same object is selected as the object for image stabilization. On the other hand, if the same object does not exist, the most reliable image stabilization target object is selected (object transfer is confirmed). In a case where all the image stabilization target candidate flags are disabled, the entire angle of view may be selected as the image stabilization target object.

Next, in step S703, the image stabilizing amount calculating unit 113 calculates a motion vector regarding the area of the image stabilization target object in the previous frame based on the area information about the image stabilization target object. If the same object does not exist in the previous frame, the value of the motion vector is set to 0.

Next, in step S704, the image stabilizing amount calculating unit 113 predicts an object blur amount of the next frame based on the motion vector amount of the previous frame and the motion vector amount of the current frame, and determines the object image stabilization position. A correction amount whose sensitivity can be controlled using a low-pass filter is calculated so that the correction value does not become a sharp value due to the predicted blur amount, and this flow ends.

Next, in step S602 of FIG. 6, the image sensor driving control unit 114 performs control so that the driving of the image sensor 102 is completed before exposure of the next frame starts, based on the predicted object blur amount (object image stabilization). Next, in step S603, the image stabilizing amount calculating unit 113 notifies information about the selected image stabilization object (object for image stabilization) that the focus detecting calculation area selecting unit 109 refers to.

Next, in step S604, the focus detecting calculation area selecting unit 109 selects an object as a focus detection target (focus detection object) from the objects acquired by the object detecting unit 108. The selection of the focus detection object is controlled so that the object can be transferred more easily than the selection of the image stabilization target performed in step S601. In addition, control is performed so that the priority according to the object type is more emphasized. For example, in a case where a human face and eyes are detected, control is performed so that the eyes are given higher priority.

Next, in step S605, the focus detecting calculation area selecting unit 109 selects a valid calculation result from the focus detection results previously calculated with N×M pixels based on the object information acquired in step S600 and information on the image stabilization object (correction area) generated in step S603. That is, the focus detecting calculation area selecting unit 109 changes the focus detecting calculation area (calculation area) based on the object information and the correction area information.

Figure 8:
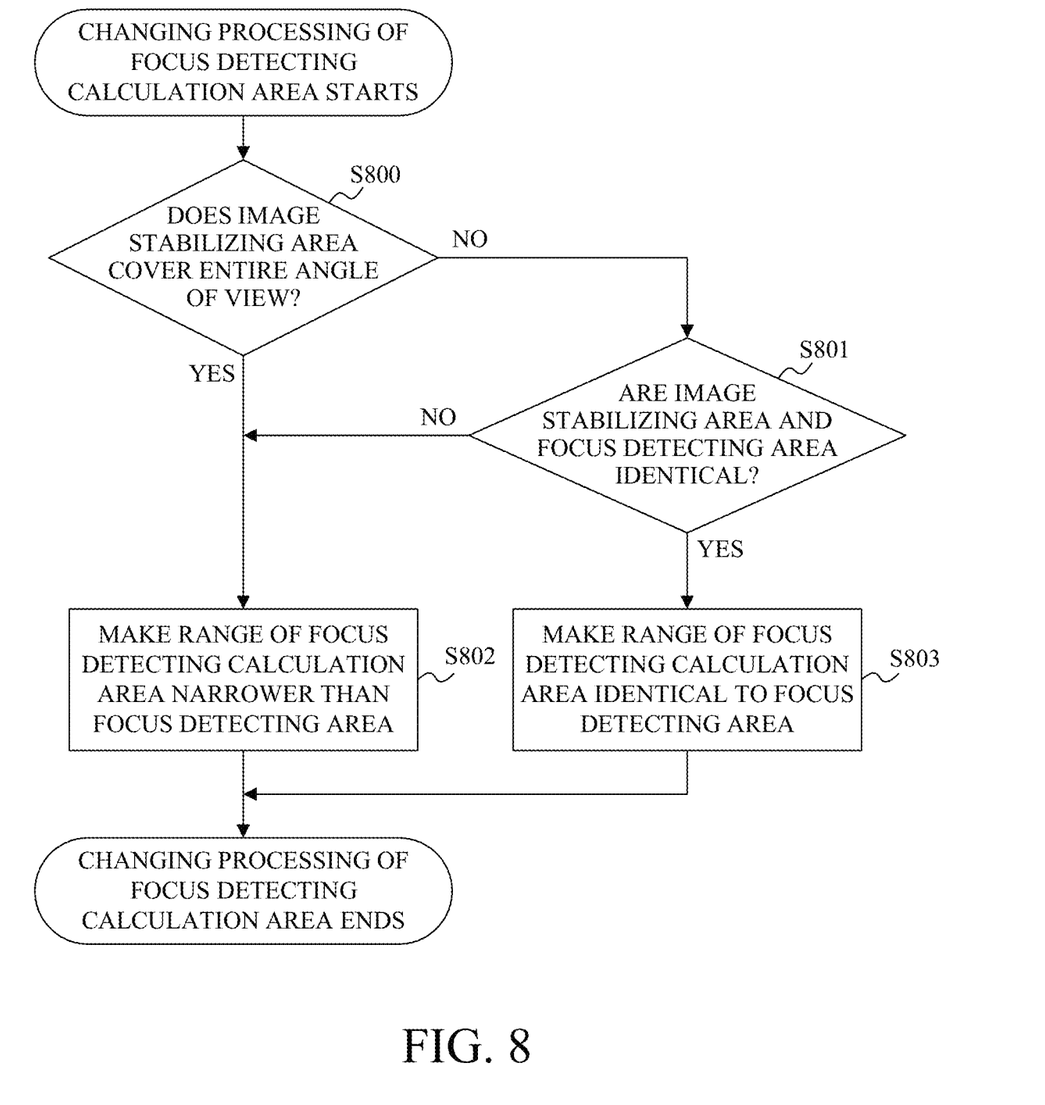
FIG. 8 is a flowchart illustrating changing processing of a focus detecting calculation area of an object according to each embodiment.

Referring now to FIG. 8, a detailed description will be given of the processing of step S605 (for changing the focus detecting calculation area). FIG. 8 is a flowchart illustrating processing for changing the focus detecting calculation area.

First, in step S800, the focus detecting calculation area selecting unit 109 determines whether or not the object image stabilizing area (image stabilizing area) covers the entire angle of view (the entire captured image). If the image stabilizing area covers the entire angle of view, the flow proceeds to step S802. On the other hand, if the image stabilizing area does not cover the entire angle of view, that is, if a specific object is to be corrected, the flow proceeds to step S801.

In step S801, the focus detecting calculation area selecting unit 109 determines whether the image stabilizing area and the focus detecting calculation area indicate the same area. If the image stabilizing area and the focus detecting calculation area indicate the same area, the flow proceeds to step S803. On the other hand, if the image stabilizing area and the focus detecting calculation area do not indicate the same area, the flow proceeds to step S802. Here, the same area includes not only a completely identical area but also a substantially identical area (approximately identical area). In a case where the entire angle of view is not set to the image stabilizing area, the focus detecting calculation area may indicate part of the image stabilizing area.

In step S802, the focus detecting calculation area selecting unit 109 makes the range of the focus detecting calculation area narrower than the object detecting position (object area) acquired by the object detecting unit 108, and this flow ends. Setting the focus detecting calculation area narrower than the object area can restrain objects at a plurality of distances from being mixed in the focus detecting calculation area.

In step S803, the focus detecting calculation area selecting unit 109 makes the range of the focus detecting calculation area identical to the object detection position (object area) acquired by the object detecting unit 108, and this flow ends. Here, the identical range includes not only a completely identical range but also a substantially identical range (approximately identical range). Setting a wide focus detecting calculation area (identical to the object area), as described above, can secure a wide calculation range for an object having a high ISO speed, low illumination, and low contrast, improving the in-focus accuracy.

Next, in step S606 in FIG. 6, the image shift amount calculating unit 110 calculates the image shift amount based on the focus detecting calculation area output from the focus detecting calculation area selecting unit 109 (focus detecting calculation). Next, in step S607, the lens driving control unit 111 converts the image shift amount into a defocus amount and drives the optical system unit 101 (lens driving), and this flow ends.

Figure 4:
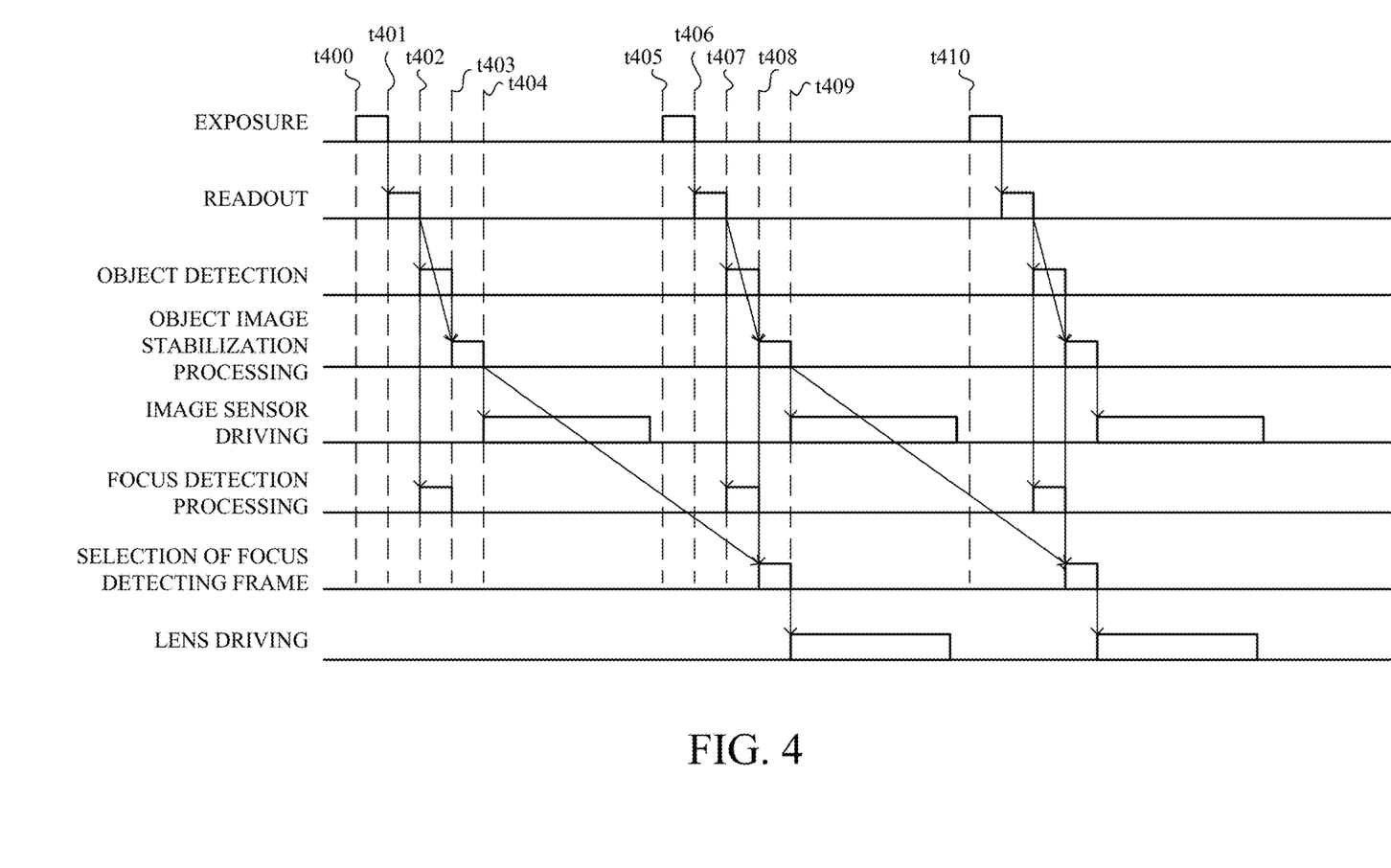
FIG. 4 is a timing chart illustrating operations relating to focus detection of the image pickup apparatus according to each embodiment.

Referring now to FIG. 4, a description will be given of a sequence from exposure of the image pickup apparatus 100 to lens driving control. FIG. 4 is a timing chart illustrating operations relating to focus detection of the image pickup apparatus 100.

First, at timing t400, the image sensor driving control unit 114 exposes an image formed via the optical system unit 101 using the image sensor 102. Next, at timing t401, the image sensor driving control unit 114 completes the exposure operation by the image sensor 102 and performs a readout operation. That is, the image sensor driving control unit 114 outputs the signal from the image sensor 102 to the object detecting unit 108, the image shift amount calculating unit 110, and the image stabilizing amount calculating unit 113 via the A/D converter 103 and the capture unit 104. Next, at timing t402, the object detecting unit 108 performs object detection processing. At approximately the same timing, the image shift amount calculating unit 110 performs calculation processing for the rectangular areas divided by N×M.

Next, at timing t403, the image stabilizing amount calculating unit 113 calculates the object image stabilizing amount based on the output of the object detecting unit 108, and notifies the focus detecting calculation area selecting unit 109 of information about the object for which object image stabilization has been performed (object information about the image stabilization target). Next, at timing t404, the image sensor driving control unit 114 starts position driving in the image height of the image sensor 102, and completes the driving by timing t405, which is an exposure start timing of the next frame. At timing t405, the image sensor 102 performs the exposure operation for the next frame of the image formed via the optical system unit 101. At subsequent timings t406 and t407, the same processing as that at timings t401 and t402 is performed.

Next, at timing t408, the image stabilizing amount calculating unit 113 calculates the object image stabilizing amount based on the output from the object detecting unit 108, and notifies the focus detecting calculation area selecting unit 109 of information about the target object for which object image stabilization has been performed. The focus detecting calculation area selecting unit 109 selects the object information about the image stabilization target obtained at timing t403 and the focus detecting calculation result obtained at timing t407 from the calculation result of the rectangular areas divided into N×M at timing t407.

Next, at timing t409, the image sensor driving control unit 114 and the lens driving control unit 111 start the position driving in the image height of the image sensor 102 and focus driving of the optical system unit 101 to focus on the object. Then, the driving is completed until timing t405, which is the exposure start timing of the next frame. Operations after timing t410 are repetitions of the operations from timings t405 to t409.

This embodiment can achieve highly accurate focus detection by reducing the frequency of removing objects from the focus detecting calculation area while performing object image stabilization.

Second Embodiment

Figure 10A:
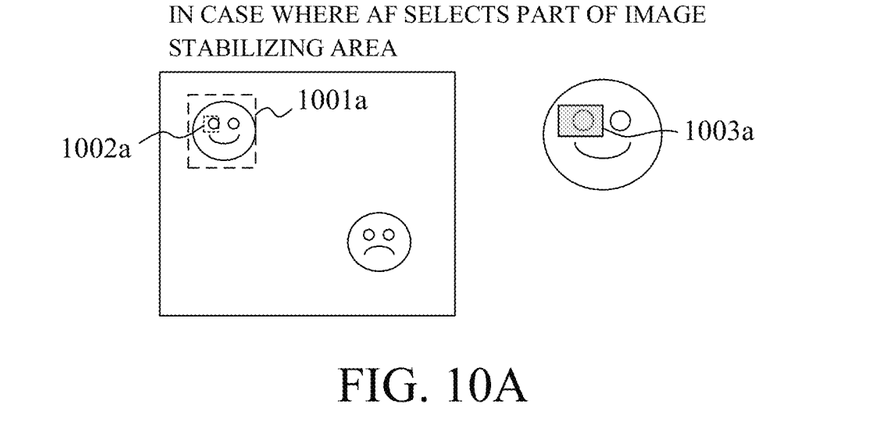
FIGS. 10A and 10B explain a focus detecting calculation area based on a relationship between an image stabilizing area and a focus detecting area according to a second embodiment.
Figure 10B:
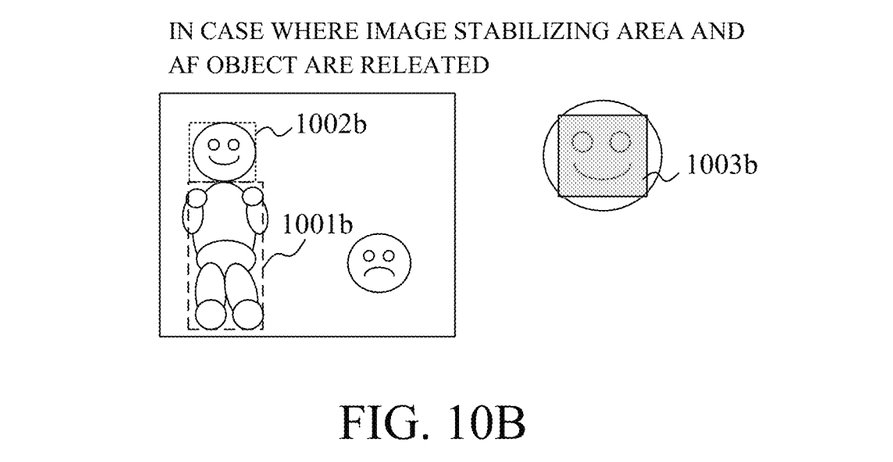

A description will now be given of a second embodiment of the disclosure. The first embodiment has discussed selecting control of a focus detecting calculation area (calculation area) in a case where an object (image stabilizing area) for which image stabilization is performed and an object (focus detecting area) for focus detection are different. This embodiment will discuss selecting control of a calculation area, with reference to FIGS. 10A and 10B, in a case where an image stabilizing area and a focus detecting area are correlated with each other. FIGS. 10A and 10B explain a focus detecting calculation area based on the relationship between the image stabilizing area and the focus detecting area. In FIGS. 10A and 10B, an alternate long and short dash line indicates an image stabilizing area, a dotted line indicates a focus detecting area, and a calculation area is indicated by an enlarged gray area on the right side of each figure.

In FIG. 10A, an image stabilizing area 1001a is a face and a focus detecting area 1002a is an eye. In this case, even if the focus detecting area 1002a goes out of the eye area due to camera shake and object blur, it can be inferred that the peripheral area is at the same distance and this embodiment performs control such that the calculation area 1003a is as wide as or wider than the focus detecting area 1002a. This embodiment discusses the relationship between a human face and an eye, but the disclosure is not limited to this embodiment. For example, the above relationship is similarly applicable to a case where the image stabilization target area is a vehicle and an area for focus detecting calculation is a person riding the vehicle. In other words, this control is performed in a case where an area that does not specify the entire angle of view is set to an image stabilizing area and part of it is set to a focus detection object position.

In FIG. 10B, an image stabilizing area 100b is a body and a focus detecting area 1002b is a face (in a case where the image stabilizing area 1001b and the focus detecting area 1002b are related object types). In general, the body has an area larger than that of the face and tends to be stable in motion. Therefore, the body may be selected as the image stabilizing area. On the other hand, in general, a focus detection object is often a face. In this case, it is assumed that the XY coordinates within the image height of the face move according to the motion of the body, and it is inferred that the same object is indicated. Accordingly, control is performed so as to make the calculation area 100b as wide as or wider than the face area (focus detecting area 1002b). The control can be performed based on coordinates (positions) or may be determined by adding information indicating the relationship between objects to index information in the object detection.

As described above, in each embodiment, the focus detecting apparatus (image pickup apparatus 100) includes a first determining unit (image stabilizing area selecting unit 112) and a second determining unit (focus detecting calculation area selecting unit 109). The first determining unit determines an image stabilizing area based on object information. The second determining unit determines a focus detecting area based on the object information, and determines a calculation area (focus detecting calculation area) for focus detection based on the focus detecting area. The second determining unit determines the calculation area based on a relationship between the image stabilizing area and the focus detecting area.

The second determining unit may determine the calculation area based on a positional relationship between the image stabilizing area and the focus detecting area. The first determining unit and the second determining unit may acquire object information based on an output signal from the image sensor 102. The focus detecting apparatus may have an image stabilizing unit (image stabilizing amount calculating unit 113, image sensor driving control unit 114) configured to perform image stabilization based on the image stabilizing area. The focus detecting apparatus further includes a calculating unit (image shift amount calculating unit 110) configured to calculate an image shift amount between image signals in the calculation area.

The object information may include information about at least one of a position (coordinates), size, reliability, and type of the object. In a case where the image stabilizing area is an entire image, the calculation area may be smaller than an object in the object information. The calculation area in a case where the image stabilizing area and the focus detecting area are the same (substantially the same) may be larger than that in a case where the image stabilizing area and the focus detecting area are different. The calculation area in a case where the focus detecting area is part of the image stabilizing area may be larger than that in a case where the image stabilizing area and the focus detecting area are different. The calculation area in a case where the image stabilizing area and the focus detecting area are related object types may be larger than that in a case where the image stabilizing area and the focus detecting area are not related object types.

In this way, by performing processing based on the relationship between the image stabilizing area and the focus detecting area, even if different areas are set for the image stabilizing area and the focus detecting area, the calculation area (focus detecting calculation area) can be properly selected. As a result, focus detection can be performed with a reduced frequency of removing the object from the focus detecting calculation area while performing image stabilization.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., CPU, micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

The disclosure can provide a focus detecting apparatus, an image pickup apparatus, a focus detecting method, and a storage medium, each of which can provide highly accurate focus detection by reducing the frequency of removing an object from a focus detecting calculation area while performing image stabilization.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-014139, filed on Feb. 1, 2022, which is hereby incorporated by reference herein in its entirety.

What is claimed is:

1. A focus detecting apparatus comprising at least one processor, and a memory coupled to the at least one processor, the memory having instructions that, when executed by the processor, perform operations as:
    a first determining unit configured to determine an image stabilizing area based on object information; and
    a second determining unit configured to determine a focus detecting area based on the object information, and to determine a calculation area for focus detection based on the focus detecting area,
    wherein the second determining unit determines the calculation area based on a relationship between the image stabilizing area and the focus detecting area, and wherein in a case where the image stabilizing area is an entire image, the calculation area is smaller than an object in the object information.

2. The focus detecting apparatus according to claim 1, wherein the instructions further perform operations as an image stabilizing unit configured to perform image stabilization based on the image stabilizing area.

3. The focus detecting apparatus according to claim 1, wherein the instructions further perform operations as a calculating unit configured to calculate an image shift amount between image signals in the calculation area.

4. The focus detecting apparatus according to claim 1, wherein the object information includes information about at least one of a position, size, reliability, and type of the object.

5. A focus detecting apparatus comprising at least one processor, and a memory coupled to the at least one processor, the memory having instructions that, when executed by the processor, perform operations as:
a first determining unit configured to determine an image stabilizing area based on object information; and
a second determining unit configured to determine a focus detecting area based on the object information, and to determine a calculation area for focus detection based on the focus detecting area,
wherein the second determining unit determines the calculation area based on a relationship between the image stabilizing area and the focus detecting area, and
wherein the calculation area in a case where the image stabilizing area and the focus detecting area are the same is larger than that in a case where the image stabilizing area and the focus detecting area are different.

6. A focus detecting apparatus comprising at least one processor, and a memory coupled to the at least one processor, the memory having instructions that, when executed by the processor, perform operations as:
a first determining unit configured to determine an image stabilizing area based on object information; and
a second determining unit configured to determine a focus detecting area based on the object information, and to determine a calculation area for focus detection based on the focus detecting area,
wherein the second determining unit determines the calculation area based on a relationship between the image stabilizing area and the focus detecting area, and
wherein the calculation area in a case where the focus detecting area is part of the image stabilizing area is larger than in a case where the image stabilizing area and the focus detecting area are different.

7. A focus detecting apparatus comprising at least one processor, and a memory coupled to the at least one processor, the memory having instructions that, when executed by the processor, perform operations as:
a first determining unit configured to determine an image stabilizing area based on object information; and
a second determining unit configured to determine a focus detecting area based on the object information, and to determine a calculation area for focus detection based on the focus detecting area,
wherein the second determining unit determines the calculation area based on a relationship between the image stabilizing area and the focus detecting area, and
wherein the calculation area in a case where the image stabilizing area and the focus detecting area are related object types is larger than that in a case where the image stabilizing area and the focus detecting area are not related object types.

8. An image pickup apparatus comprising:
an image sensor; and
a focus detecting apparatus,
wherein the focus detecting apparatus includes at least one processor, and a memory coupled to the at least one processor, the memory having instructions that, when executed by the processor, perform operations as:
a first determining unit configured to determine an image stabilizing area based on object information; and
a second determining unit configured to determine a focus detecting area based on the object information, and to determine a calculation area for focus detection based on the focus detecting area,
wherein the second determining unit determines the calculation area based on a relationship between the image stabilizing area and the focus detecting area, and
wherein in a case where the image stabilizing area is an entire image, the calculation area is smaller than an object in the object information.

9. A focus detecting method comprising:
a first determining step configured to determine an image stabilizing area based on object information; and
a second determining step configured to determine a focus detecting area based on the object information, and to determine a calculation area for focus detection based on the focus detecting area,
wherein the second determining step determines the calculation area based on a relationship between the image stabilizing area and the focus detecting area, and
wherein in a case where the image stabilizing area is an entire image, the calculation area is smaller than an object in the object information.

10. A non-transitory computer-readable storage medium storing a program for causing a computer to execute the focus detecting method according to claim 9.

11. The focus detecting apparatus according to claim 5, wherein the instructions further perform operations as an image stabilizing unit configured to perform image stabilization based on the image stabilizing area.

12. The focus detecting apparatus according to claim 5, wherein the instructions further perform operations as a calculating unit configured to calculate an image shift amount between image signals in the calculation area.

13. The focus detecting apparatus according to claim 5, wherein the object information includes information about at least one of a position, size, reliability, and type of the object.

14. The focus detecting apparatus according to claim 6, wherein the instructions further perform operations as an image stabilizing unit configured to perform image stabilization based on the image stabilizing area.

15. The focus detecting apparatus according to claim 6, wherein the instructions further perform operations as a calculating unit configured to calculate an image shift amount between image signals in the calculation area.

16. The focus detecting apparatus according to claim 6, wherein the object information includes information about at least one of a position, size, reliability, and type of the object.

17. The focus detecting apparatus according to claim 7, wherein the instructions further perform operations as an image stabilizing unit configured to perform image stabilization based on the image stabilizing area.

18. The focus detecting apparatus according to claim 7, wherein the instructions further perform operations as a calculating unit configured to calculate an image shift amount between image signals in the calculation area.

19. The focus detecting apparatus according to claim 7, wherein the object information includes information about at least one of a position, size, reliability, and type of the object.

* * * * *